INVENTOR.
ALBERT WOLINSKY

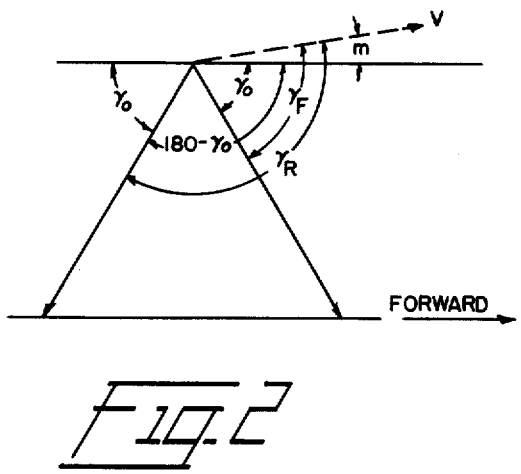
*Fig. 2*
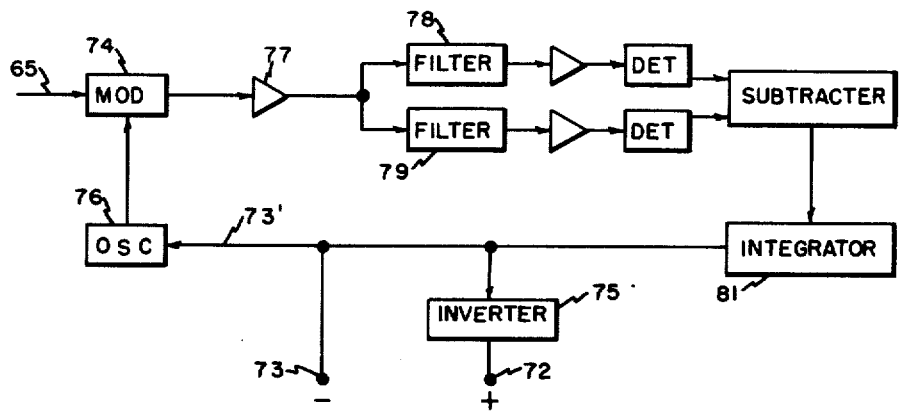
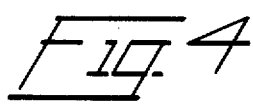

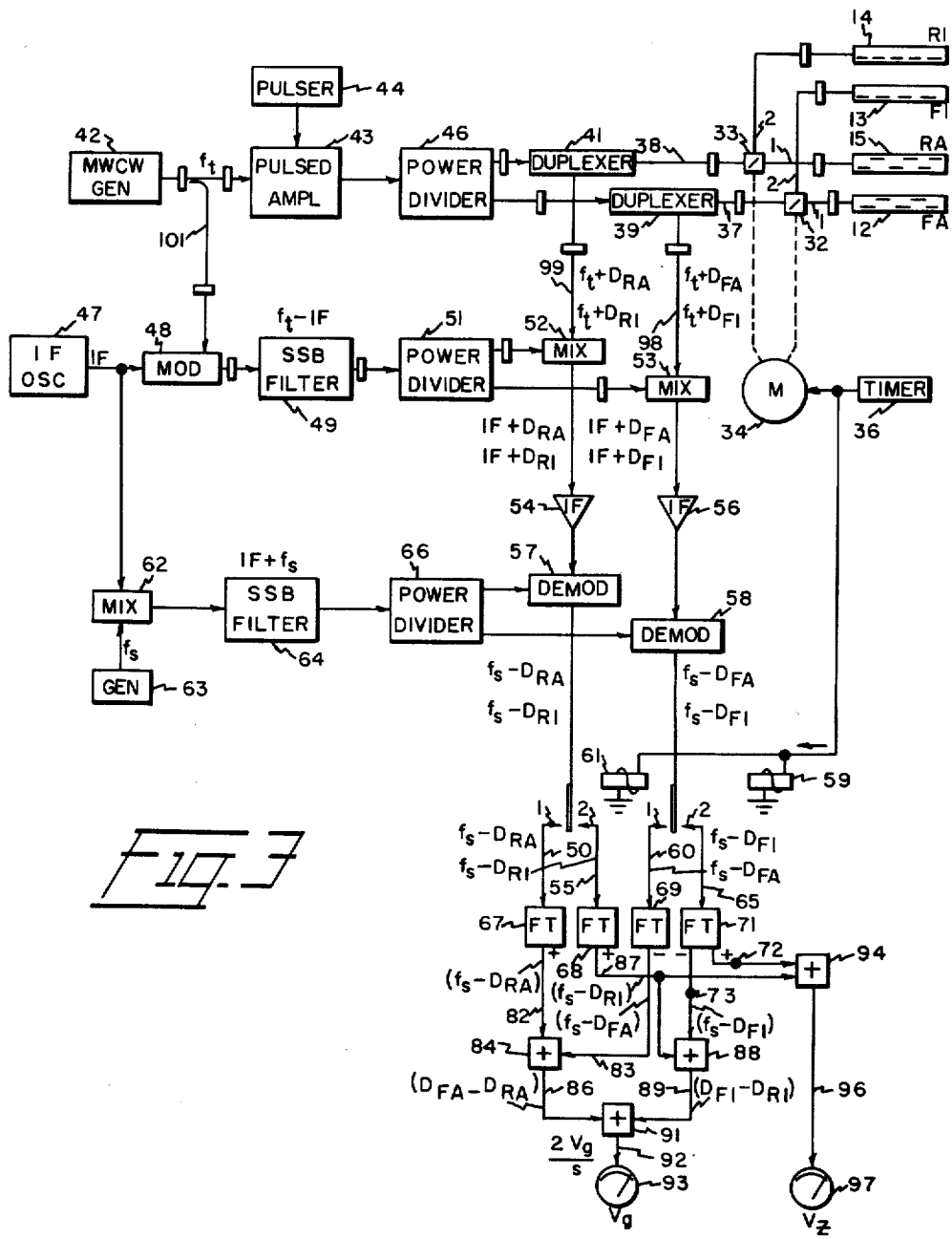

United States Patent Office 2,923,000
Patented Jan. 26, 1960

2,923,000

MICROWAVE SYSTEM FOR VELOCITY MEASUREMENTS

Albert Wolinsky, New Rochelle, N.Y., assignor to General Precision Laboratory Incorporated, a corporation of New York Application December 31, 1956, Serial No. 632,619

4 Claims. (Cl. 343—8)

This invention relates to aircraft velocity measuring systems and in particular to microwave devices for measuring horizontal and vertical aircraft velocity.

Microwave radio systems have been extensively used for measuring relative velocity by measuring the Doppler shift in the frequency of a beam reflected from a moving object. When an appropriate type of antenna is used for transmission and reception this Doppler shift is independent of changes in the microwave transmitting frequency.

The present invention provides airborne equipment for measuring ground track velocities and vertical velocities simultaneously, both measurements being frequency-independent. An important feature of the equipment is the antenna which consists of four linear arrays, horizontally stabilized and oriented to ground track by means which are outside of the scope of this invention.

Components associated with the antenna receive four Doppler-shifted signals from it and combine them so as to derive an electrical signal having a frequency representative of horizontal aircraft velocity parallel to the ground track. The magnitude of this signal is completely independent of any shifts in the microwave transmitting frequency and is unaffected by the presence of aircraft vertical velocity. Two of the four received signals are used twice. In their second utilization these signals are separated from the others and provide a second electrical signal having a frequency representative of vertical aircraft velocity. The magnitude of this signal also is completely independent of any shifts in the microwave transmitting frequency and its accuracy is independent of horizontal velocity and of changes therein.

The object of this invention is to provide an airborne instrument for measuring the ground track velocity and the vertical velocity of the aircraft, both measurements being independent and both being free of error caused by changes in the transmitting frequency.

A further understanding of this invention may be secured from the detailed description and associated drawings, in which:

Figure 2 illustrates the geometry of the microwave beams emitted by the antenna of Fig. 1.

Figure 3 is a schematic circuit diagram of the invention utilized with the antenna of Fig. 1.

Figure 4 depicts the schematic circuit of a frequency tracker for use in the circuit of Fig. 3.

Figure 1:
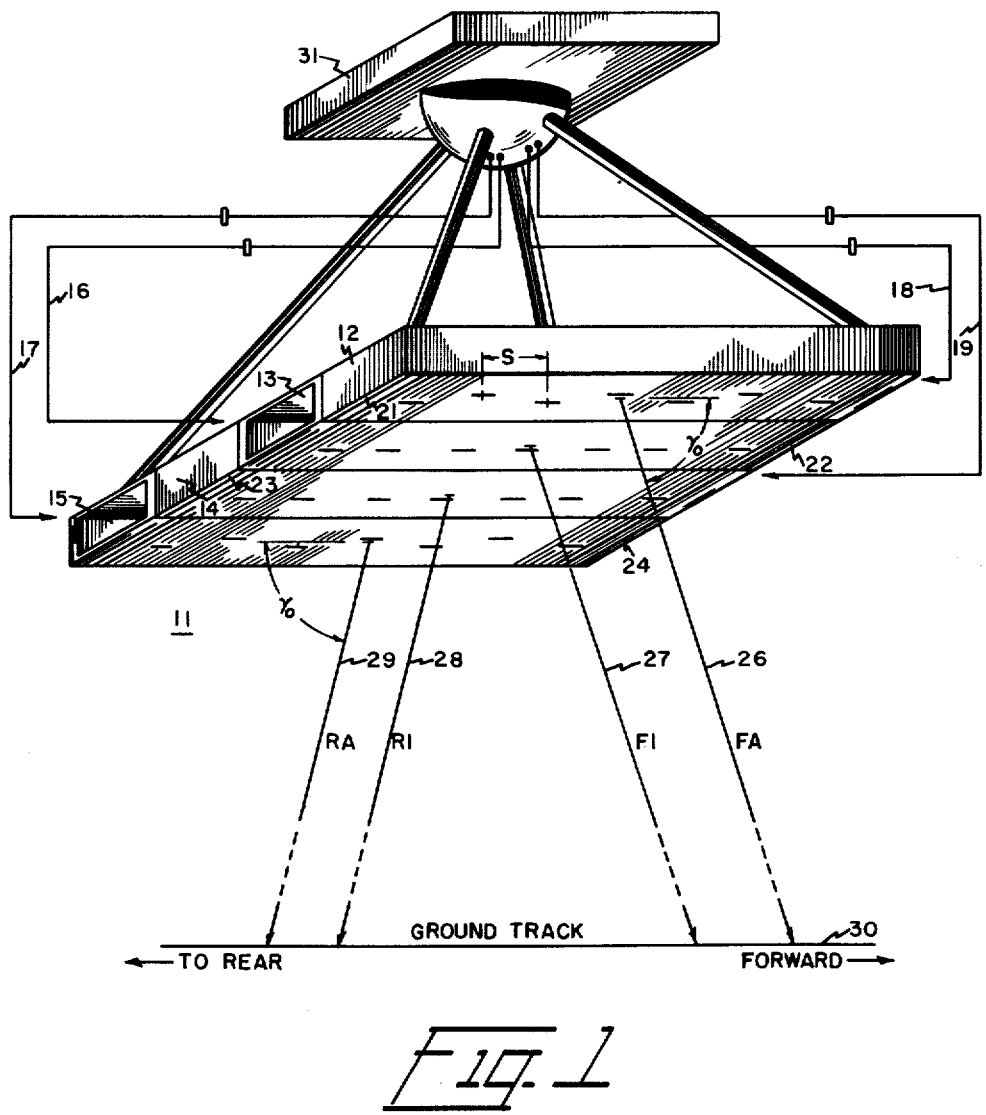
Figure 1 depicts the four linear array antennas utilized in this invention.

Referring now to Fig. 1, a microwave antenna 11 is composed of four linear arrays 12, 13, 14, and 15, placed parallel and in the same plane, with the radiating elements, schematically indicated by dashed lines, facing downward. These elements may be dipoles, slots, or of any other kind, but are so arranged and energized that two of the arrays, 13 and 14, operate as inphase arrays and two, 12 and 15, operate an antiphase arrays. Two arrays, 13 and 15, are fed from the left end through waveguides 16 and 17, and the other two arrays, 12 and 14, are fed from the right end through waveguides 18 and 19. The ends of all four arrays distant from their feed ends are closed by microwave-absorbing plates 21, 22, 23, and 24.

Each of these linear arrays is designed to emit a partial cone of radiation from its face containing the radiating elements, the axis of the cone being coincident with the longitudinal axis of that face. Each of the inphase arrays emits its radiation cone in the direction away from its feed end and each of the antiphase arrays emits its radiation cone in the direction toward its feed end. The line elements or beams of these radiation cones which are in the vertical plane comprehending the antenna's longitudinal axis are indicated in the drawing by the arrows 26, 27, 28, and 29, which are partly dashed to indicate that they are long compared to the antenna dimensions. These arrows are terminated at line 30 designated "ground track." Assuming the antenna in an aircraft and horizontal, the two cones of radiation to the right, which will be termed the forward direction, are coincident and the two left or rear cones are coincident, although the arrows are drawn separately for clarity. Each cone intersects the earth in a broad hyperbolic line of constant Doppler frequency difference, having its center on the ground track. The acute angles which the four beams 26, 27, 28, and 29 make with the lower face of the antenna are all equal and are designated as angle $\gamma_0$. This angle is also in each case the half-angle of the cone of radiation.

The foregoing antenna is installed in an aircraft by a support structure 31. This support structure contains a horizontal stabilizer to maintain the antenna plane horizontal and an orienting device to maintain the antenna axis pointing parallel to the ground track of the aircraft.

Several forms of horizontal stabilizer are available, perhaps the simplest of which operates on the principle of a damped pendulum. One simple form of orienting device secures from a magnetic compass an indication of North direction relative to the aircraft heading. By adding wind angle secured from air speed and meteorological data this device derives the direction of ground track with sufficient accuracy for the purpose of this invention and servoes the antenna to this direction. The same result may also be secured by use of a drift sight.

The four beams 26, 27, 28, and 29 may be characterized in terms of their directions and whether emitted by inphase or antiphase arrays by the letters FA, FI, RI, and RA respectively, F and R designating "forward" and "rear," and A and I designating "antiphase" and "inphase." When the antenna is on an aircraft moving relatively to the earth, the received microwave beams reflected from the earth are different in frequency by a number of cycles per second, D, from the transmitting frequency, by reason of the Doppler phenomenon. These Doppler difference frequencies may be distinguished by subscripts of the above letters.

Let it be assumed that the aircraft has a velocity V, this direction making a climb or dive angle $m$ with the horizontal direction. The angles which the beams make with the velocity direction are $\gamma_F$ and $\gamma_R$. The Doppler frequency shifts of these beams are $$D = \frac{2V}{\lambda} \cos \gamma \tag{1}$$

in which $\lambda$ is the wavelength of the transmitted microwave energy in free space, and $\gamma$ is the angle between the beam and the direction of the velocity. D is frequency-dependent both because the expression contains $\lambda$ and because its contains $\gamma$, for $\gamma_0$ is a component of $\gamma$ and is dependent on $\lambda$ as shown by the following relations:

$$\cos \gamma_{0I} = \frac{\lambda}{\lambda_g} = \sqrt{1 - \left(\frac{\lambda}{2a}\right)^2} \tag{2}$$

$$\cos \gamma_{OA} = \frac{\lambda}{2s} - \frac{\lambda}{\lambda_g} \quad (3)$$

in which $\gamma_{OI}$ refers to an inphase beam, $\gamma_{OA}$ refers to an antiphase beam, $s$ is radiator spacing, $\lambda_g$ is the microwave length in the rectagular waveguides comprising the linear arrays of Fig. 1, and $a$ is the internal width of these waveguides. However, by either actually or constructively employing the "Janus" principle the frequency-dependence of the beam direction angle may be eliminated. The Janus principle as used herein consists of the subtraction of the rear beam received signal frequency from the forward beam received signal frequency to secure a double average Doppler difference frequency. It is contrasted to the coherent demodulation principle in which the difference between the received beam signal frequency and the transmitted beam signal frequency, $f_t$, is derived. When the Janus principle is used, the subtraction of the two return signal frequencies involves mathematically the addition of the trigonometric cosines of the two angles $\gamma_O$, so that Equations 2 and 3 may be added provided the two return signals are those of an inphase and an antiphase array:

$$\cos \gamma_{OI} + \cos \gamma_{OA} = \frac{\lambda}{2s} \quad (4)$$

When the individual Doppler difference frequencies of forward and rear beams are subtracted, inspection of Fig. 1 shows that two cases are possible.

Case 1. $D_{FA} - D_{RA}$ and $D_{FI} - D_{RI}$
Case 2. $D_{FA} - D_{RI}$ and $D_{FI} - D_{RA}$ The use of either one of these two cases of combinations of antennas and beams will provide frequency-independent horizontal velocity output signals, but only Case 1 will provide frequency-independent vertical velocity output signals. The situation of Case 1 is therefore selected for instrumentation in the present invention.

The two Janus difference signals of Case 1 may be combined by addition, in which case the benefits of Janus combination of inphase and antiphase arrays and beams are indirectly secured by virtue of Equation 4. This may be demonstrated in the following manner. From Fig. 2 it is seen that $$\gamma_{FI} = \gamma_{OI} + m \quad (5)$$
$$\gamma_{RI} = 180° - \gamma_{OI} + m \quad (6)$$
$$\gamma_{FA} = \gamma_{OA} + m \quad (7)$$
$$\gamma_{RA} = 180° - \gamma_{OA} + m \quad (8)$$

Thus, by Equation 1 one has $$D_{FI} = \frac{2V}{\lambda}(\cos \gamma_{OI} \cos m - \sin \gamma_{OI} \sin m) \quad (9)$$

$$D_{RI} = \frac{2V}{\lambda}(-\cos \gamma_{OI} \cos m - \sin \gamma_{OI} \sin m) \quad (10)$$

$$D_{FA} = \frac{2V}{\lambda}(\cos \gamma_{OA} \cos m - \sin \gamma_{OA} \sin m) \quad (11)$$

$$D_{RA} = \frac{2V}{\lambda}(-\cos \gamma_{OA} \cos m - \sin \gamma_{OA} \sin m) \quad (12)$$

From these equations, the differences of Case 1 in the Doppler difference frequencies are obtained as $$D_{FI} - D_{RI} = \frac{4V}{\lambda} \cos \gamma_{OI} \cos m \quad (13)$$

$$D_{FA} - D_{RA} = \frac{4V}{\lambda} \cos \gamma_{OA} \cos m \quad (14)$$

From this is obtained, under consideration of Equation 4

$$(D_{FI} - D_{RI}) + (D_{FA} - D_{RA})$$
$$= \frac{4V}{\lambda}(\cos \gamma_{OI} + \cos \gamma_{OA}) \cos m = \frac{2V \cos m}{s} = \frac{2V_x}{s} \quad (15)$$

That is, the derivation of the Doppler beat frequencies from forward and rear beams, their proper pairing, finally, the summing of the pair frequencies results in a frequency which represents ground speed multiplied by a constant. This is constructive Janus demodulation, and the result is frequency-independent. If the pair frequencies be averaged instead of added, the result of Equation 15 is to be divided by the constant 2, and becomes, therefore, $$\frac{V_g}{s}$$

Inspection of Fig. 2 shows that if the dive or climb angle $m$ be not limited, the return microwave frequency of either beam may be either larger or smaller than the transmitting frequency, $f_t$, so that, algebraically, D in Equation 1 may be either positive or negative depending on the sign of cos $\gamma$. Since negative frequency is physically unrealizable, it is necessary in instrumenting this invention to distinguish Doppler frequencies derived from a received signal of frequency greater than $f_t$ from Doppler frequencies derived from a received signal of frequency less than $f_t$. This is done in demodulation by increasing the Doppler-like output frequency.

The two inphase linear arrays 13 and 14, Fig. 1, are capable of giving a signal representative of vertical velocity. It is merely necessary to derive from each its Doppler frequency difference by individual and coherent demodulation, employing a portion of the transmitting microwave energy, and to add the resulting two Doppler frequencies. Then $$D_{FI} + D_{RI} = -\frac{2V_z}{a} \quad (16)$$

in which $V_z$ is the vertical velocity of the aircraft and $a$ is the internal width of the microwave rectangular waveguide sections comprising the linear arrays.

Equation 16 is derived as follows. Adding Equations 9 and 10, one obtains $$D_{FI} + D_{RI} = -\frac{4V}{\lambda} \sin \gamma_{OI} \sin m \quad (17)$$

But in an inphase array the relation between beam direction and rectangular waveguide width $a$, as given by Equation 2, is $$\sin \gamma_{OI} = \frac{\lambda}{2a} \quad (18)$$

so that Equation 17 becomes $$D_{FI} + D_{RI} = -\frac{2V}{a} \sin m = -\frac{2V_z}{a} \quad (19)$$

Signals representing the output quantities of this invention, $V_g$ and $V_z$, are obtained by providing suitable instrumentation for solving Equations 15 and 16. This instrumentation is indicated in the block diagram of Fig. 3, in which the four linear arrays 12, 13, 14, and 15 represent the like-numbered arrays of Fig. 1. These arrays are connected as depicted in the combination previously described as Case 1, antiphase array 12 and inphase array 13 directing beams forward and inphase array 14 and antiphase array 15 directing beams to the rear.

Two-position microwave switches 32 and 33 which may be of the form described in Patent No. 2,690,539 are operated by a motor 34 and a 1-c.p.s. timer 36 to connect the arrays in pairs in alternation to microwave conductors 37 and 38 terminating at duplexers 39 and 41.

A microwave continuous-wave generator 42 which may have a frequency $f_t$, for example, of 10,000 m.c.p.s. is connected to an amplifier 43 modulated by a pulser 44. The output of the amplifier 43 is transmitted through a power divider 46 to duplexers 39 and 41 and through them to the antenna. An intermediate frequency oscillator 47 is connected to a modulator 48 which also secures energy from generator 42 through a directional coupler and waveguide 101. The output of modulator 48 containing modulation products is passed through a band-pass filter 49 passing only the lower sideband. This lower side band energy is divided by a power divider 51 between two mixers or first demodulators 52 and 53, where the demodulating energy is mixed with the received signals to form lower sideband signals. These signals are amplified in intermediate frequency amplifiers 54 and 56. The intermediate frequency signals are heterodyned in demodulators 57 and 58 to secure signals representing Doppler frequency signals. The outputs of the demodulators 57 and 58 are transmitted through two single-pole double-throw electromagnetic switches 59 and 61 operated from timer 36 in synchronism with radio-frequency switches 32 and 33 to switch positions numbered 1 and 2.

The demodulators 57 and 58 obtain their demodulating signals from intermediate frequency oscillator 47, but the demodulating signals are shifted in frequency by a small amount from that of oscillator 47. This is effected in a mixer 62 by applying the output of a frequency-shifting generator 63. The resulting upper sideband is selected by a band-pass filter 64 and is apportioned by power divider 66 to the demodulators 57 and 58.

The fixed contacts of switches 59 and 61 are connected through conductors 50, 55, 60, and 65 to four frequency trackers 67, 68, 69, and 71. These are similar and conventional and are like the frequency tracker described in copending application Serial No. 314,306, filed October 11, 1952. These trackers are generally depicted in Fig. 4, which depicts tracker 71 having input conductor 65 and positive and negative output terminals 72 and 73. The other frequency trackers 67, 68, and 69 are identical except that one of the output terminals is unused.

In Fig. 4 a spectrum of frequencies in the audio range is applied from input conductor 65 to a balanced modulator 74, in which the spectrum is frequency-converted by use of oscillator 76 to a suitable, selected frequency range. The signal so produced is amplified in amplifier 77 and applied to two filters 78 and 79 which are sharply tuned just above and below a nominal selected median frequency. The outputs are discriminated by detection and subtraction to generate a direct current representing the variation of the spectrum average from the nominal selected frequency. This is integrated in integrator 81 and applied at conductor 73' to correct the output signal frequency of oscillator 76. This correction potential is also the tracker negative output at terminal 73. An equal positive output is made available at terminal 72 by inverting the negative potential in an inverter 75.

Thus each frequency tracker finds and tracks the center Doppler spectrum frequency and discriminates and integrates to emit a continuous direct potential representative thereof.

The tracker outputs 82 and 83 are of opposite polarities and are added in adding circuit 84 to form a sum potential in conductor 86. Likewise, tracker outputs 73 and 87 are of opposite polarities and are added in adding circuit 88 to form a sum potential in conductor 89. The summation function of adder 84 combined with the polarity inversion function of frequency tracker 69 actually amounts to subtraction, and the data carried by conductor 86 represents the difference of the data carried by conductors 50 and 60. Thus the operation "$D_{FA}-D_{RA}$" previously described in Case 1 is carried out. Similarly adder 88 and polarity reversal in frequency tracker 71 amount to subtraction and produce data in conductor 89 which is the difference "$D_{FI}-D_{RI}$" of data in conductors 55 and 65 as described previously as part of Case 1.

The signals present in conductors 86 and 89 are applied to an adding circuit 91, the output of which is applied through conductor 92 to a utilizing device 93 which may be, for example, an indicating voltmeter. Its indications are representative of aircraft ground track velocity $V_g$, and the meter may be calibrated directly in speed units.

The outputs 87 and 72 of frequency trackers 68 and 71 are applied to an adding circuit 94, and the output thereof is applied through conductor 96 to a utilizing device 97 which may be, for example, an indicating voltmeter. Its indications are representative of aircraft vertical velocity $V_z$, and the meter may be calibrated directly in speed units.

In describing the operation of the circuit of Fig. 3, it is to be understood that the four switches 32, 33, 59, and 61 dwell simultaneously and for one half of the timer cycle on their contacts or terminal conductors having the reference character 1, and dwell simultaneously and for the other half of the timer cycle on contacts 2.

The two microwave echo signals received during the first half-cycle from linear arrays 12 and 15 may be said to have the frequencies $f_t+D_{FA}$ and $f_t+D_{RA}$. These signals are transmitted through duplexers 39 and 41 and conductors 98 and 99 respectively to mixers 53 and 52. During the other half-cycle the signals from linear arrays 13 and 14 having the frequencies $f_t+D_{FI}$ and $f_t+D_{RI}$ are transmitted through waveguide conductors 98 and 99.

Oscillator 47 generates alternating current at the frequency IF, which may be, for example, 60 mc.p.s. This signal is modulated in modulator 48 by a small amount of transmitter power through conductor 101, generating sidebands, the lower of which is selected by filter 49 and applied through power divider 51 to mixers 52 and 53. The lower sideband has the frequency $f_t-IF$, so that the mixer outputs have the frequencies $IF+D_{FA}$, $IF+D_{RA}$, $IF+D_{FI}$, and $IF+D_{RI}$, which amplified in amplifiers 54 and 56 and applied to demodulators 57 and 58.

The oscillator 47 output IF is also applied to mixer 62, where it is modulated by the output of generator 63 which may, for example, have a frequency of 10 kc.p.s. This frequency must be above the highest Doppler frequency. The upper one of the two generated sidebands is selected by filter 64, its frequency being the intermediate frequency plus the frequency of sensing generator 63, or $IF+f_s$. This signal is applied through power divider 66 to mixers 57 and 58, so that the modulation products have the frequencies $f_s-D_{FA}$, $f_s-D_{RA}$, $f_s-D_{FI}$, and $f_s-D_{RI}$. Thus when the Doppler frequency is positive the demodulator output frequency will be in the range of zero to $f_s$, and when negative it will be in the range of $f_s$ to $2f_s$. When switches 59 and 61 are on contacts 1 the signal having frequency $f_s-D_{FA}$ is applied to frequency tracker 69 and its output is a direct potential of a magnitude representing that frequency magnitude. This potential is applied to adding circuit 84 through conductor 83 and is identified by the same term in parentheses ($f_s-D_{FA}$). Similarly the other input to circuit 84 is ($f_s-D_{RA}$), and the inputs to adding circuit 88 are ($f_s-D_{RI}$) and ($f_s-D_{FI}$).

In adding circuit 84 the output is a direct potential having the magnitude ($D_{FA}-D_{RA}$) and the output of circuit 88 is a direct potential magnitude of ($D_{FI}-D_{RI}$). These, however, are the terms on the left of Equation 15, so that if they be added as in this equation the output is a function of $V_g$. This is done in the circuit of Fig. 3 by applying these quantities through conductors 86 and 89 to an adding circuit 91. The output potential represents $$\frac{2V_g}{s}$$

and the scale factor of indicator 93 permits $V_g$ to be read directly.

When the output voltage quantities of frequency trackers 68 and 71, both being of the same polarity, are either added or averaged, as in circuit 94, the output is either $2f_s-(D_{FI}+D_{RI})$ or one-half of this quantity. This output contains the variable term $D_{FI}+D_{RI}$, and therefore, as shown by Equation 16, vertical velocity may be represented thereby. By scale factor adjustment the indicator 97 may be made to read directly in $V_z$ units.

Thus by appropriate antenna construction and circuit configuration both horizontal velocity and vertical velocity may be determined and indicated separately and both indications are made wholly independent of any variations in frequency which may occur in the transmitted signal.

What is claimed is:

1. An aircraft velocity measuring system comprising, an antenna including a pair of inphase microwave linear arrays and a pair of antiphase microwave linear arrays positioned in side by side relation in a plane, means for exciting each of the arrays of said antenna to produce four radiation beams, two of which, one from one of said antiphase arrays and the other from one of said inphase arrays are projected towards the earth's surface in a forward direction and the other two beams of which one from the other of said antiphase arrays and the other from said other inphase array are projected towards the earth's surface in a rear direction, means including said arrays for receiving echo signals reflected from the earth's surface by the impingement of said beams thereon, means for deriving Doppler signals from each of said reflected signals, each of said respective Doppler signals having a frequency representative of the Doppler shift in frequencies received by a respective array, means for converting each of said Doppler signals to a respective direct current signal the magnitude of which is representative of the frequency of a respective Doppler signal, means for subtracting the direct current signals derived from the Doppler signals received by the forward and rear projecting antiphase arrays to produce a first difference signal, means for subtracting the direct current signals derived from the Doppler signals received by the forward and rear projecting inphase arrays to produce a second difference signal, means for averaging said first and second difference signals to provide a signal representative of horizontal speed, and means for adding only the direct current signals derived from the Doppler signals received by said inphase arrays to provide a signal representative of vertical speed.

2. An aircraft velocity measuring system comprising, a pair of inphase microwave linear arrays and a pair of antiphase microwave linear arrays positioned in side by side relation in a plane, a microwave generator, means for producing pulsed signals therefrom, means including duplexer means for individually energizing each of said arrays, one of said inphase and one of said antiphase arrays being energized from one end and the other of said inphase and the other of said antiphase arrays being energized from the other end whereby said one inphase and said other antiphase array direct radiation beams toward the earth's surface in a forward direction and said other inphase and said one antiphase array direct radiation beams toward the earth's surface in a rear direction, means including said duplexer means for receiving distinct echo signals reflected from the earth's surface and impinging on each of said individual arrays, each of said distinct echo signals having frequencies which are Doppler-shifted from the frequency of said microwave generator by an amount and in a sense depending on the movement of said aircraft in space, heterodyne means for deriving individual video signals from each of said echo signals, the frequencies of said video signals being representative of the Doppler shifts of said echo signals respectively, means for deriving an individual direct current signal from each of said video signals the magnitude of which is proportional to the frequency thereof, means for subtracting the direct current signals derived from the echo signals received by the forward and rear directed beams of said inphase arrays to produce a first difference signal, means for subtracting the direct current signals derived from the echo signals received by the forward and rear directed beams of said antiphase arrays to produce a second difference signal, means for adding said first and second difference signals to produce a signal representative of horizontal speed and means for adding the direct current signals derived from the echo signals received by said inphase arrays to produce a signal representative of vertical speed.

3. An aircraft velocity measuring system comprising, an antenna including a pair of inphase microwave linear arrays and a pair of antiphase microwave linear arrays positioned in side by side relation in a plane, means generating transmission signals, means for receiving echo signals reflected from the earth's surface, duplexer circuit means interconnecting said transmission signal means and said receiving means with opposite ends of said inphase arrays and opposite ends of said antiphase arrays whereby each of said arrays has an individual beam pattern of transmission and reception, that of one of said inphase and one of said antiphase arrays being directed forward and that of the other of said inphase and the other of said antiphase arrays being directed to the rear, means for deriving separate Doppler difference signals from the echo signals received by individual ones of said arrays the frequency of each of which is proportional to the difference between a selected fixed frequency and the Doppler-shifted frequency of the separate echo signals received by the corresponding one of said arrays, means for converting each of said Doppler difference signals into a direct current signal the magnitude of each of which is proportional to the frequency of the Doppler difference signal from which it was derived, means for subtracting the direct current signals produced as a result of the conversion of the echo signals received by said inphase arrays to produce a first difference signals, means for subtracting the direct current signals produced as a result of the conversion of the echo signals received by said antiphase arrays to produce a second difference signal, means for adding said first and second difference signals to produce a signal indicative of horizontal speed, and means for adding the direct current signals produced as a result of the conversion of echo signals received by said inphase arrays to produce a signal representative of vertical speed.

4. An aircraft velocity measuring system comprising, an antenna including a pair of inphase microwave linear arrays and a pair of antiphase microwave linear arrays positioned in side by side relation in a plane, means for exciting each of the arrays of said antenna to produce four radiation beams, the beams from one of said antiphase arrays and one of said inphase arrays being projected towards the earth's surface in a forward direction and the beams from the other of said antiphase arrays and the other of said inphase arrays being projected towards the earth's surface in a rear direction, means for deriving Doppler frequency representative signals from echo signals reflected from the earth's surface by each of said beams, means for subtracting the Doppler frequency representative signals derived from the echo signals produced by said forward and rear projecting antiphase arrays to produce a first difference signal, means for subtracting the Doppler frequency representative signals derived from the echo signals produced by said forward and rear projecting inphase arrays to produce a second difference signal, means averaging said first and second difference signals to provide a signal representative of horizontal speed, and means adding the Doppler frequency representative signals derived from the echo signals produced by said inphase arrays to produce a signal representative of vertical speed.

No references cited.